(12) United States Patent
Hart et al.

(10) Patent No.: US 12,719,578 B2
(45) Date of Patent: Aug. 25, 2026

(54) WIRELESS NETWORK ARCHITECTURE USING OPTICAL CABLING

(71) Applicant: Cisco Technology, Inc., San Jose, CA (US)

(72) Inventors: Brian D. Hart, Sunnyvale, CA (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 639 days.

(21) Appl. No.: 18/172,948

(22) Filed: Feb. 22, 2023

(65) Prior Publication Data

US 2024/0283538 A1 Aug. 22, 2024

(51) Int. Cl.
*H04B 10/27* (2013.01)
*H04B 10/2575* (2013.01)

(52) U.S. Cl.
CPC ....... *H04B 10/27* (2013.01); *H04B 10/25752* (2013.01)

(58) Field of Classification Search
CPC .......................... H04B 10/27; H04B 10/25752
See application file for complete search history.

(56) References Cited

U.S. PATENT DOCUMENTS 6,198,558 B1 * 3/2001 Graves ............... H04Q 11/0062 370/395.51
6,810,270 B1 * 10/2004 Grohn .................. H04J 3/0647 455/560
10,797,805 B1 10/2020 Mirfakhraei et al.
2003/0185564 A1 * 10/2003 Hayashi ............ H04Q 11/0062 398/58
2014/0212135 A1 7/2014 Ji et al.
2015/0003239 A1 1/2015 Gong
2017/0126320 A1 * 5/2017 Cho ................ H04B 10/25754
2018/0034517 A1 * 2/2018 Hart .................... H04B 7/0452
2019/0245593 A1 * 8/2019 Hart .................... H04B 7/0452
2020/0213877 A1 * 7/2020 Harel .................... H04W 40/02
2021/0373581 A1 12/2021 Shattil
2024/0072896 A1 * 2/2024 Wei .................... H04B 10/2575
2024/0405910 A1 * 12/2024 Ito ....................... H04J 14/0298

* cited by examiner

*Primary Examiner* — Pranesh K Barua
(74) *Attorney, Agent, or Firm* — Patterson + Sheridan, LLP

(57) ABSTRACT

A wireless network architecture with optical connections is described, the architecture enables fronthaul connections that ensure reliable communication between RH and central controllers without being hampered by impairments and other interference in the connections. The architecture includes a central control system, a plurality of radio heads, and a plurality of optical fiber fronthaul connections between the central control system and the plurality of radio heads.

14 Claims, 9 Drawing Sheets

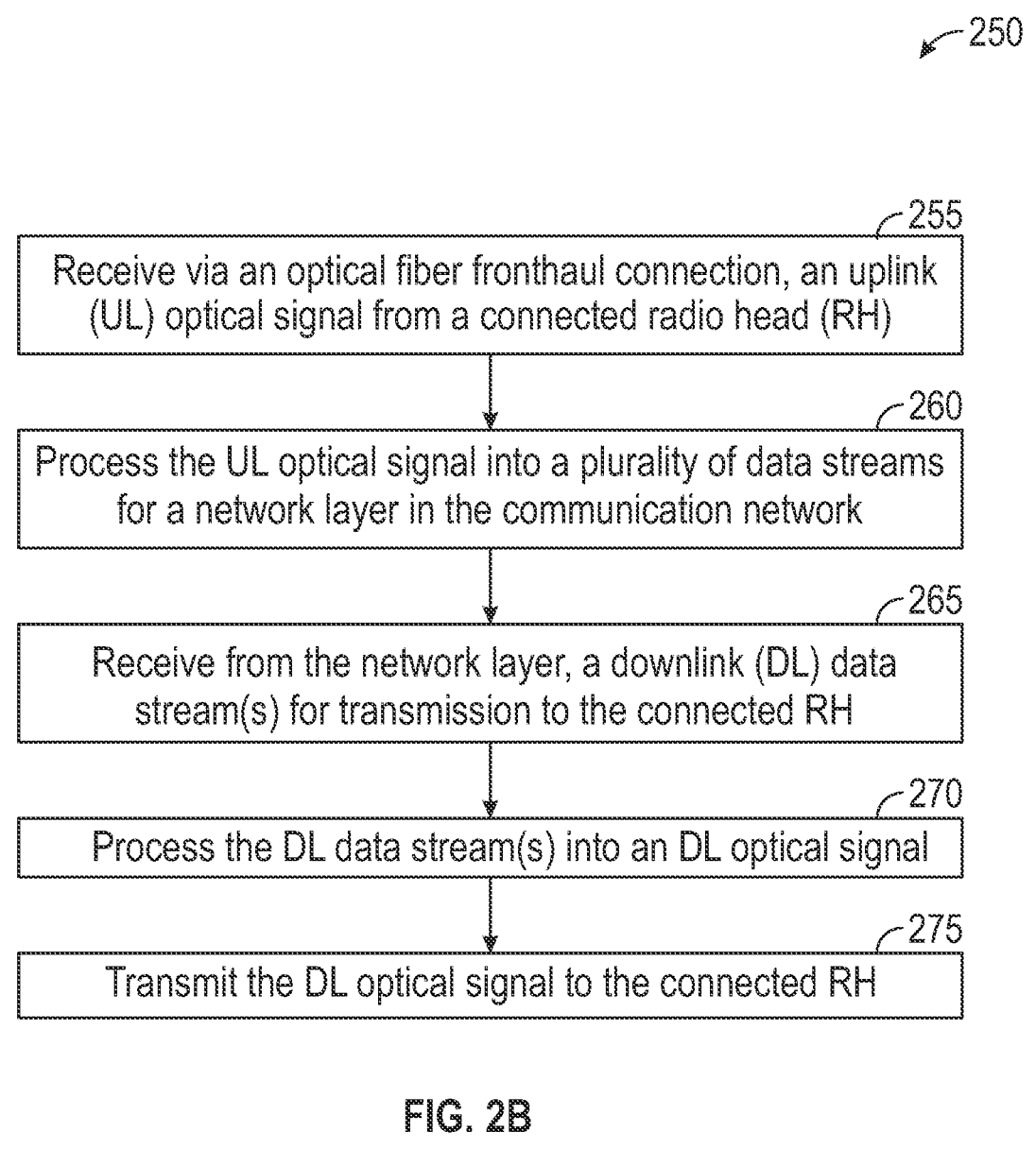

250

255 Receive via an optical fiber fronthaul connection, an uplink (UL) optical signal from a connected radio head (RH)

260 Process the UL optical signal into a plurality of data streams for a network layer in the communication network 265 Receive from the network layer, a downlink (DL) data stream(s) for transmission to the connected RH 270 Process the DL data stream(s) into an DL optical signal 275 Transmit the DL optical signal to the connected RH

FIG. 2B

WIRELESS NETWORK ARCHITECTURE USING OPTICAL CABLING

TECHNICAL FIELD

Embodiments presented in this disclosure generally relate to communication networks and wireless communication, and, more particularly, to providing wireless communication using distributed radio heads (RHs) connected via optical fiber connections to a centralized control system.

BACKGROUND

Wireless networks using a distributed Multi-User Multiple-Input Multiple-Output (MU-MIMO) is developing technology with a goal of achieving more parallelism of transmissions and fewer collisions in the network traffic. Distributed Uplink MU-MIMO (UL-MU-MIMO) for uncoordinated systems, such as Wi-Fi networks, etc., requires that raw samples be fronthauled to a centralized baseband processor to coordinate the various traffic and transmissions. Distributed Downlink MU-MIMO (DL-MU-MIMO) typically functions in a similar manner.

Some network architectures replaced access points (APs) in a network with radio heads (RHs). This architecture provides diversity reception and collision resolution on the uplink connections, and distributed beamforming, collision avoidance, and global traffic prioritization on the downlink connections. Uplink prioritization is also possible on the uplink, with triggered access from connected clients. However, these network architectures are limited due to the latency and capacity limitations of the physical wired connections between RHs and central control systems.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 2A and 2B are flowcharts of methods for utilizing optical fibers in a wireless network architecture, according to an example embodiments.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
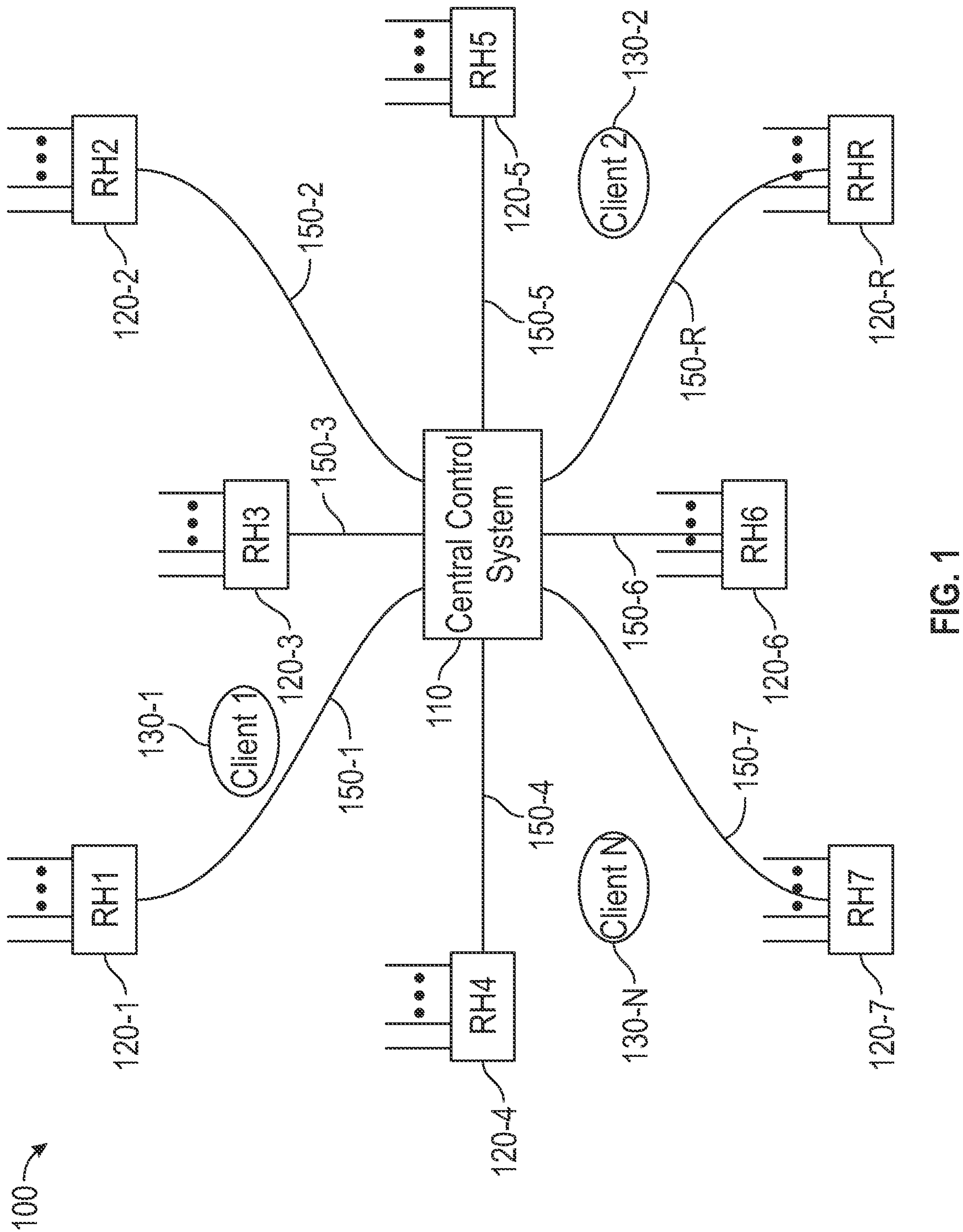
FIG. 1 is a diagram of a wireless network architecture, according to an example embodiment.

A system of one or more hardware components can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions of a method. The method includes receiving, at a central control system via an optical fiber fronthaul connection, an uplink (UL) optical signal from a connected radio head (RH) in a communication network, processing, at the central control system, the UL optical signal into a plurality of data streams for a network layer in the communication network, receiving, from the network layer, a downlink (DL) data stream for transmission to the connected RH, processing the DL data stream into an DL optical signal, and transmitting the DL optical signal to the connected RH.

One example embodiment includes a method. The method includes receiving, from a client device, a plurality of received (RX) signals via plurality of antennas in a radio head (RH), processing the plurality of RX signals at the RH to generate an uplink (UL) optical signal. The method also includes transmitting the UL optical signal from the RH to a central control system via an optical fiber fronthaul connection, receiving downlink (DL) optical signal from the central control system via the optical fiber fronthaul connection, processing the DL optical signal at the RH to generate a plurality of transmission (Tx) signals, and transmitting the plurality of Tx signals via the plurality of antennas.

One general aspect includes a network system. The networking system includes a central control system, a plurality of radio heads, and a plurality of optical fiber fronthaul connections between the central control system and the plurality of radio heads, where the central control system may include a plurality of hardware components, a control processor coupled to the plurality of hardware components and configured to perform a control operation. The operation may include: receiving, at the central control system via an optical fiber fronthaul connection, an uplink (UL) optical signal from a radio head (RH) of the plurality of RHs in a communication network, processing, at the central control system, the UL optical signal into a plurality of data streams for a network layer in the communication network, receiving, from the network layer, a downlink (DL) data stream for transmission to the RH, and processing the DL data stream into an DL optical signal. The operation may also include transmitting the DL optical signal to the RH using the optical fiber fronthaul connection. The system also includes where the RH may include a plurality of hardware components and a RH processor coupled to the plurality of hardware components and configured to perform a RH operation. The RH operation may include: receiving, from a client device, a plurality of received (RX) signals via an antenna in the RH, processing the plurality of RX signals to generate the uplink (UL) optical signal, transmitting the UL optical signal to a central control system via an optical fiber fronthaul connection, receiving the downlink (DL) optical signal from the central control system via the optical fiber fronthaul connection, processing the DL optical signal to generate a plurality of transmission (Tx) signals, and transmitting the plurality of Tx signals via the antenna.

Example Embodiments

Wireless local area networks (WLAN) architectures typically utilize access points (APs) which are network devices distributed about an area, to provide wireless radios and other subsystems for wireless devices to connect to the network. These architectures include some level of wired interconnections, such wired connection between the APs and the rest of the local area network to facilitate network connections between the APs and external networks (e.g., the Internet). The AP based architectures rarely provide traffic or transmission coordination across the network including across independent APs, and may then also still encounter various interference and other traffic collisions between connected devices and the respective APs.

Some developing architectures, such as Optimal Wireless Networking Architecture (OWNA), centralize the media access control (MAC) and baseband processing in a central controller, and replace semi-independent APs distributed through an environment with radio heads (RHs). The RHs include a limited amount of hardware and instead rely on quickly relaying any received signals, network traffic, etc. to the central controller for processing. This architecture has many benefits including diversity reception and collision resolution on uplink connections, and distributed beamforming, collision avoidance, and global traffic prioritization on downlink connections. Additional benefits include uplink prioritization for some network traffic on uplink connections with triggered access. While the RHs are typically limited in the functions/processing they perform, the RHs may perform radio frequency (RF)-to-samples or RF-to-baseband conversion and vice versa, automatic gain control (AGC), etc.

In some examples, the RHs and central controller are connected via twisted pair or optical cabling and carry digital baseband data. However, in this example slot latency is challenging given the 2.5/5/10G latency from 802.3-defined low-density parity-check (LDPC) encoding/decoding. Additionally, 320 MHz and 8 or 16 spatial streams require more capacity than available on a 10 Gbps cable. In some examples, 1K Quadrature Amplitude Modulation (QAM) and 4KQAM are also very sensitive to phase noise in the twisted pair cabling and the clock signals extracted from the twisted-pair connections experience disruptive levels of impairments.

The systems and method described herein provide for a wireless network architecture with optical connections that enable fronthaul connections that ensure reliable communication between RH and central controllers without being hampered by impairments and other interference in the connections, as described herein.

FIG. 1 is a diagram of a wireless network architecture, according to an example embodiment. A network 100 is shown that includes a central control system 110, including a central media access control/PHY processor connected to or in communication with a plurality of radio heads (RHs) 120-1-120-R which are physically separated from each other and arranged to wirelessly communicate with one or more wireless client devices, such as clients 130-1-130-N. The RHs 120-1 and 120-R are connected to central controller system 110 via optical fibers 150-1-150-R.

In some examples, the network 100 and the central control system 110 provide provides centralized transceiver functions for the connected RH and Wi-Fi OWNA features in the network such as distributed DL-MU-MIMO, distributed UL-MU-MIMO, collision avoidance, collision resolution, etc. Additionally, the central control system 110 provides for "triggered access" for clients. For example, clients 130-1-130-N may transmit when they are triggered (polled) not at any time, such that the infrastructure of the network 100 can schedule all signal transmissions in the network 100 without uncontrolled collisions. In some examples, the triggered access and other centralized control improves Wi-Fi performance. For example, rather than inter-basic service set (BSS) collisions, the network 100 includes parallel transmissions of up to (e.g.) 16 or 32 spatial streams within a BSS or across nearby co-channel BSSs, in both DL and UL connections. In some examples, the network 100 also provides precise rate selection since the network 100 is only experiencing pathloss, fading, noise and known multi-user interference, and not random collisions.

Figure 3:
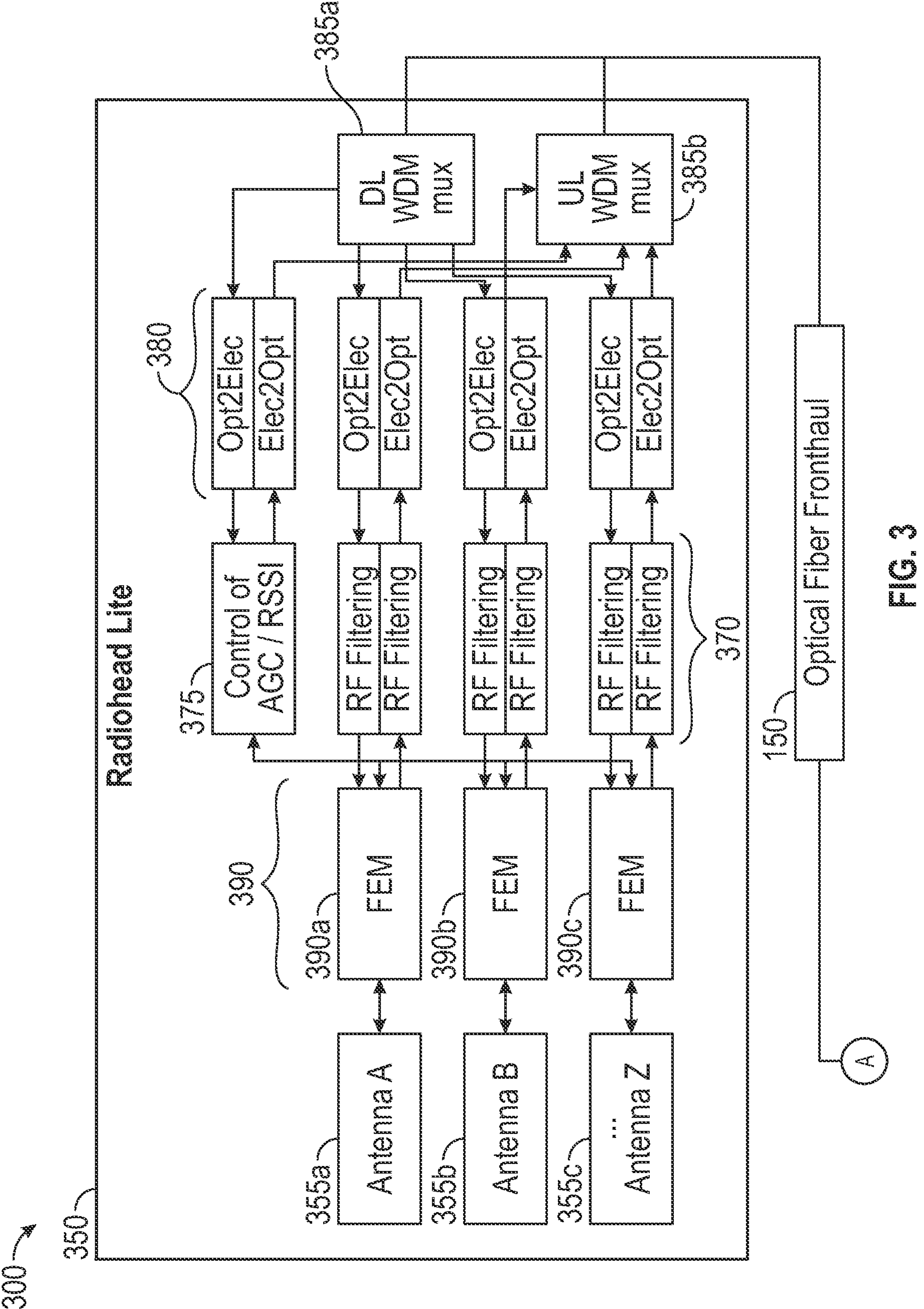
FIG. 3 is an arrangement of network architecture utilizing analog optical signals, according to an example embodiment.
Figure 3:
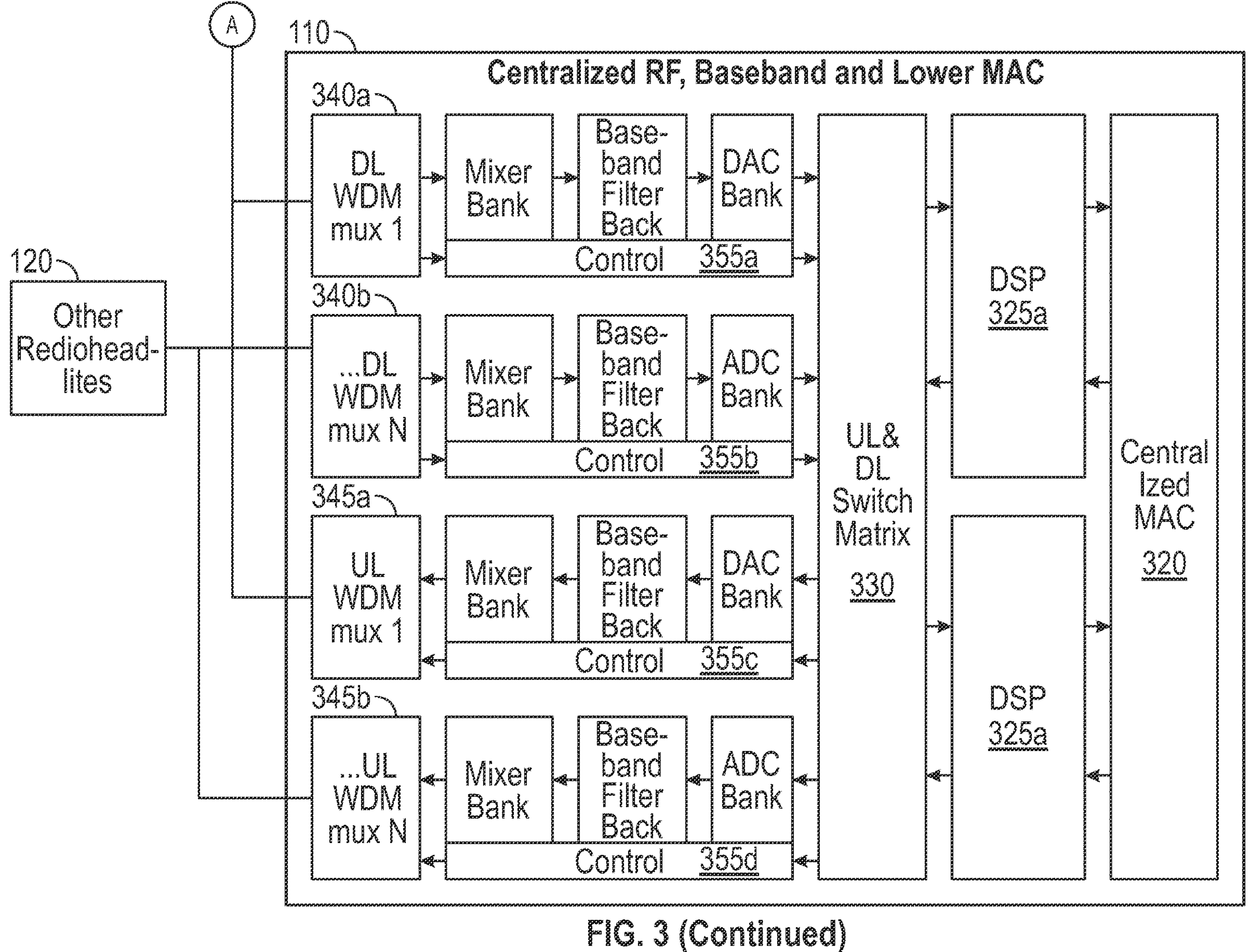
Figure 4:
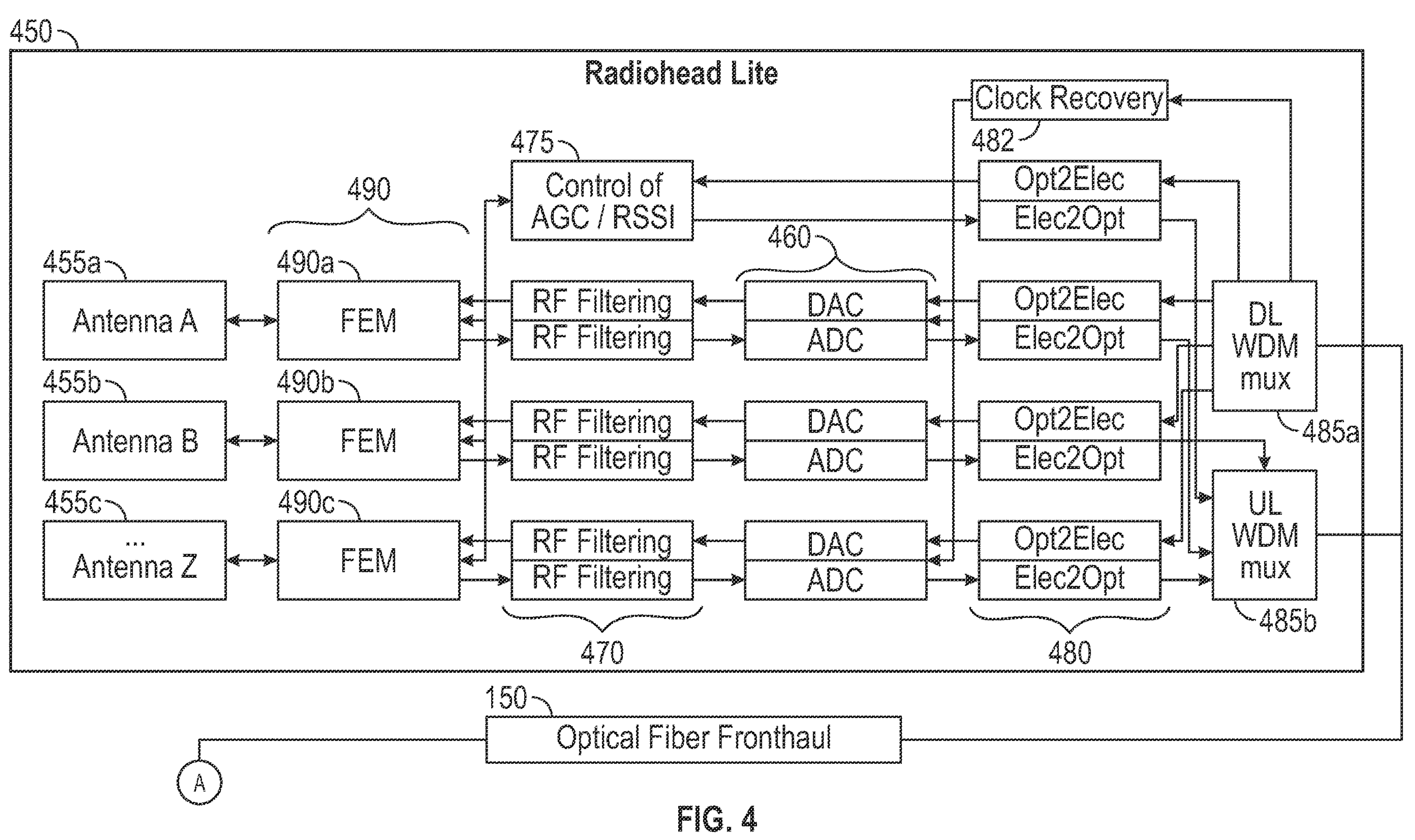
FIG. 4 is an arrangement 400 of network architecture utilizing digital optical signals, according to an example embodiment.
Figure 4:
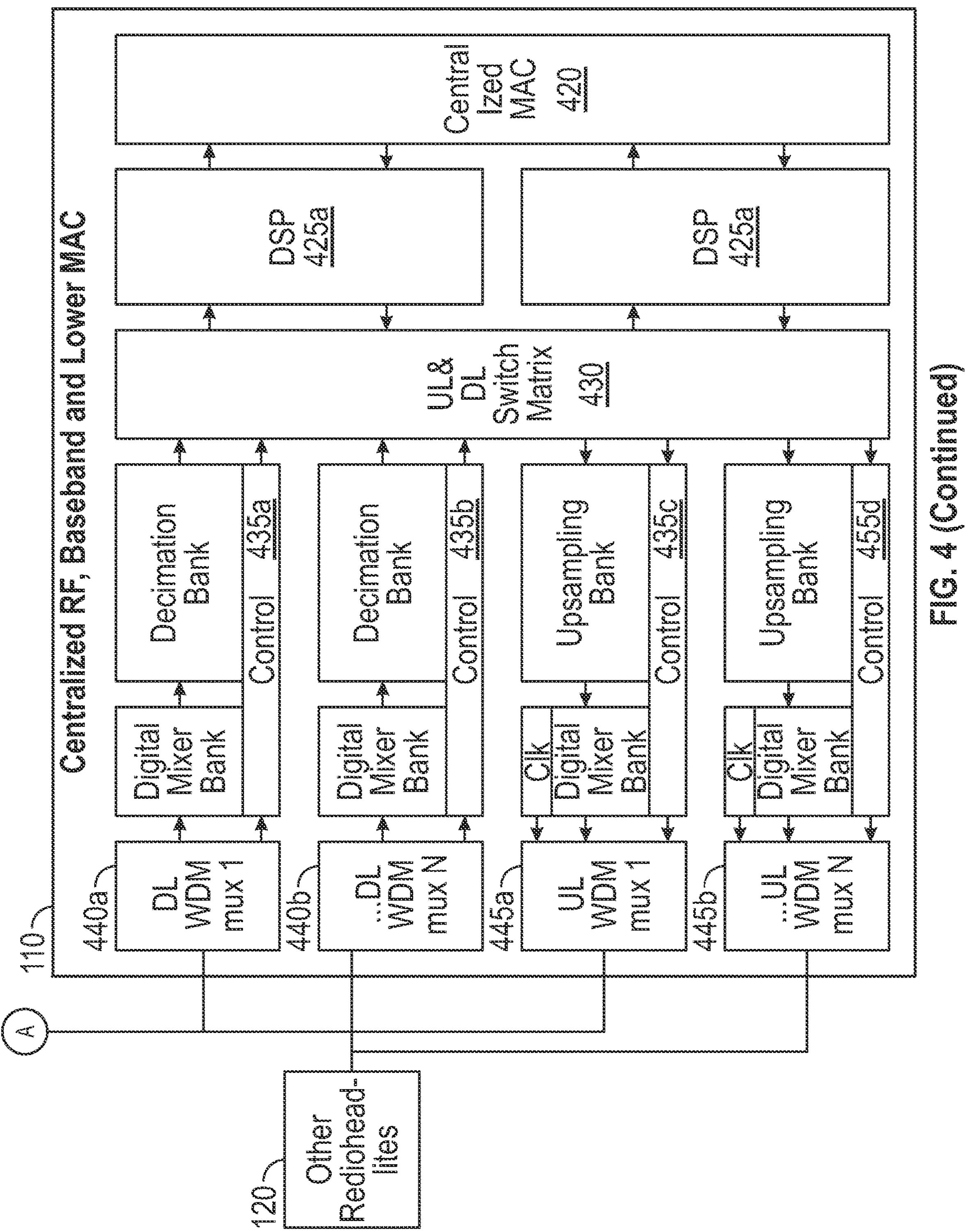
Figure 5:
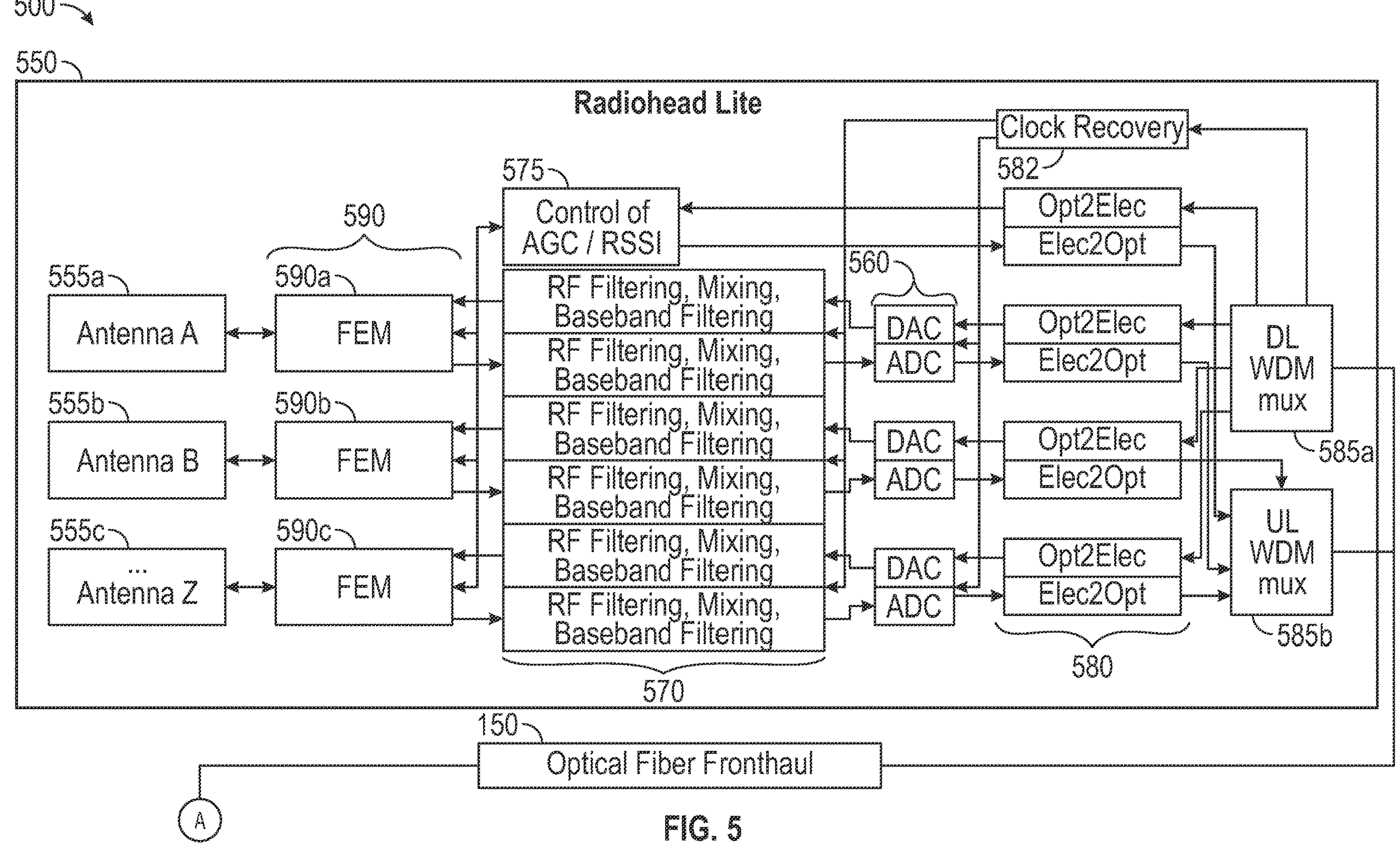
FIG. 5 is an arrangement 500 of network architecture utilizing digital optical signals with baseband filtering, according to an example embodiment.
Figure 5:
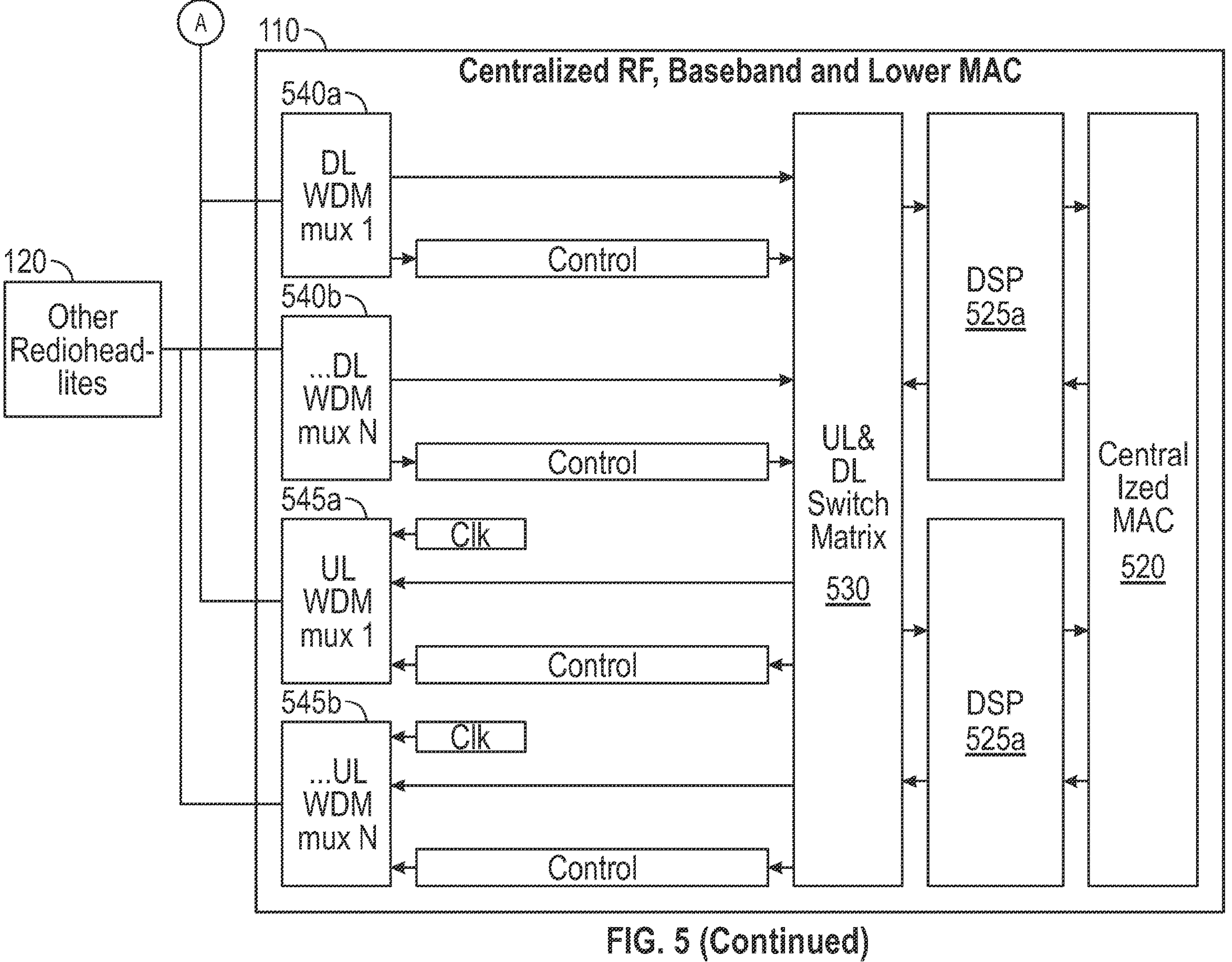

In some examples, the network 100 also achieves lower latency for quality of server (QoS) flows since the flows are scheduled at the central control system 110. Overall throughput is also increased since signal deferral can be replaced by scheduling parallel transmissions in as many BSSs as possible. In some examples, each RH of the RHs 120-1-120-R includes one or more antennas (as shown in FIGS. 3-5), a downconverter for each antenna, an upconverter for each antenna, and automatic gain control circuitry/functionality. As a result, each RH generates multiple receive (Rx) signals, one received by each antenna, associated with a transmission made by a client device. In addition, each RH can transmit multiple (Tx) signals, each via a corresponding transceiver and antenna path, using MIMO techniques as described in more detail in relation to FIGS. 2A and B and 3-5, herein.

Figure 2A:
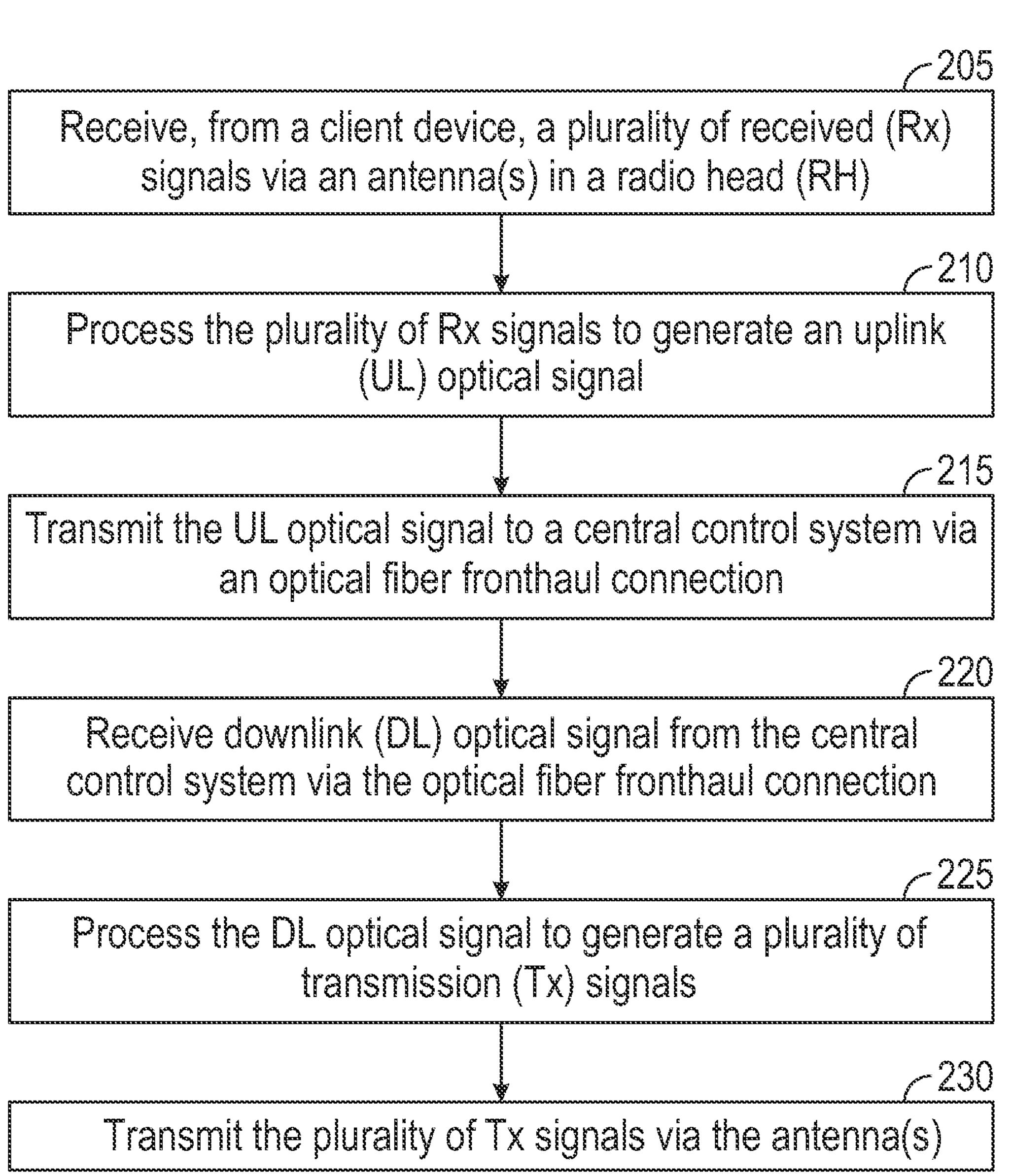

FIGS. 2A and 2B are flow charts of methods for utilizing optical fibers in a wireless network architecture, according to an example embodiments. FIG. 2A illustrates a method 200 for processing signals on a RH and FIG. 2B illustrates a method 250 for processing signals on a central controller. In some examples, the methods 200 and 250 occur in parallel between the RH and the central controller. In some examples, the methods may be performed by the RH and controllers shown in FIGS. 3-5. For ease of discussion, reference will be made to FIGS. 3-5 in the discussion of the methods 200 and 250. FIG. 3 is an arrangement 300 of network architecture utilizing analog optical signals. FIG. 4 is an arrangement 400 of network architecture utilizing digital optical signals. FIG. 5 is an arrangement 500 of network architecture utilizing digital optical signals with RH baseband filtering.

Differences between the arrangements 300, 400, and 500, relate to which component (e.g., the RH or system 110) is performing various signal processing. In each of the arrangements 300, 400, and 500, the respective RHs (e.g., RH 350, 340, and 550) have a respective RH control 375, 475, 575 which receives control signals and frequency/clock signals, at clock recovery module 482 and 582, from the central control system 110. The RH controls may also provide automatic gain control (AGC) and received signal strength indication (RSSI).

In some examples, the various processes of method 200 performed by the RH, including arrangements 300, 400, and 500, may be performed according to control signals transmitted from the central control system 110. For example, the various RHs may receive one or more control signals and a reference frequency signal from the central control system 110 on a spare wavelength in a DL optical signal(s) and execute the one or more controls signals on the RH according to received frequency signal. Method 200 begins a block 205 where a RH receives, from a client device, a plurality of received (Rx) signals via antennas in a radio head (RH).

For example, an RH, such as the RH 120-1, receives wireless Rx signals from a client 130-1. In the arrangement 300, a RH 350 receives Rx signals via the antennas 355*a*-355*c*. In the arrangement 400, a RH 450 receives Rx signals via the antennas 455a-455c. In the arrangement 500, a RH 550 receives Rx signals via the antennas 555a-555c.

At block 210, the RH processes the plurality of Rx signals to generate an uplink (UL) optical signal and transmits the UL optical signal to a central control system via an optical fiber fronthaul connection at block 215. For example, in the arrangement 300, the UL optical signal is an analog signal or a plurality of UL analog signals, and the RH 350 processes the Rx signals at Front-end Modules (FEMs) 390 including FEMs 390a-390c. The RH 350 also includes RF filters 370, each of which filters one of the plurality of Rx signals. The RH 350 also converts the plurality of Rx signals to a plurality of analog optical signals using optical-to-electrical/electrical-to-optical (O2E/E2O) converters 380. The RH 350 also multiplexes (using WDM) the plurality of analog optical signals into the UL optical signal at MUX 385b. In some examples, WDM is used to provide signal isolation among the multiplexed signals. In the arrangement 300, no mixing or sampling is performed on the RH 350, and each wavelength is modulated by RF signals spanning for instance 0.5-7.5 GHz of RF frequency. Once the UL optical signal is generated at the MUX 385b, the RH 350 transmits the UL optical signal to the central control system 110 via an optical fiber fronthaul connection 150.

In the arrangement 400, the UL optical signal is a digital signal, and the RH 450 processes the Rx signals at FEMs 490 including FEMs 490a-490c. The RH 450 also includes RF filters 470 and each RF filter filters one of the plurality of Rx signals. The RH 450 also converts the plurality of Rx signals to a plurality of digital optical signals using Analog-to-Digital Converter/Digital-to-analog converters (ADC/DAC) 460 and O2E/E2O converters 480. The RH 450 also multiplexes the plurality of digital optical signals into the UL optical signal at MUX 485b. In some examples, WDM is used to provide signal isolation among the multiplexed digital signals. In the arrangement 400, no mixing is performed on the RH 450, however, RF filtering and sampling may be performed by the filter 470 and converters 460 and each wavelength is modulated by RF signals spanning up to say 7.5 GHZ of RF frequency. Once the UL optical signal is generated at the MUX 485b, the RH 450 transmits the UL optical signal to the central control system 110 via the optical fiber fronthaul connection 150.

In another example, in the arrangement 500, where the UL optical signal is a mixed and filtered digital signal, the RH 550 processes the Rx signals at FEMs 590 including FEMs 590a-590c. The RH 550 also includes RF filters and mixers 570 and filters and mixers the plurality of Rx signals. The RH 550 also converts the plurality of Rx signals to a plurality of digital optical signals using Analog to Digital Converter/Digital to ADC/DAC 560 and O2E/E2O converters 580. The RH 550 also multiplexes the plurality of digital optical signals into the UL optical signal at MUX 585b. In some examples, WDM is used to provide signal isolation among the multiplexed signals. In the arrangement 500, some level of mixing and sampling is performed on the RH 550, and each wavelength is modulated by a sampled IQ signal with up to say 320 MHz of bandwidth. Once the UL optical signal is generated at the MUX 585b, the RH 550 transmits the UL optical signal to the central control system 110 via the optical fiber fronthaul connection 150. In some examples, in the arrangements 400 and 500, all of the digital signals from the RH may be multiplexed together and transmitted over a "fat pipe" such as N*100 Gbps optical links.

Returning back to FIG. 2A, at block 220 the RH receives downlink (DL) optical signal from the central control system via the optical fiber fronthaul connection and processes the DL optical signal to generate a plurality of transmission (Tx) signals at block 225. In the arrangement 300, the DL optical signal is a filtered and mixed analog signal, and the RH 350 demultiplexes the filtered and mixed analog signal into a plurality of DL analog signals at the MUX 385a. The RH 350 also converts the plurality of DL analog signals into the plurality of Tx signals using the O2E/E2O converters 380, RF filters 370, and FEMs 390. The RH 350 transmits the Tx signals via the plurality of antennas 355a-355b to client(s), such as the clients 130 at block 230 of method 200.

In the arrangement 400 the DL optical signal is an upsampled and mixed digital signal(s), the RH 450 demultiplexes the upsampled and mixed digital signal into a plurality of DL digital signals at the MUX 485a. The RH 450 also converts the plurality of DL digital signals into the plurality of Tx signals using the O2E/E2O converters 480, ADC/DAC 460, RF filters 470, and FEMs 490. The RH 450 transmits the Tx signals via the plurality of antennas 455a-455b to client(s), such as the clients 130 at block 230 of method 200.

In the arrangement 500 the DL optical signal is a digital baseband signal, the RH 550 demultiplexes the digital signal into a plurality of DL digital signals at the MUX 585a. The RH 550 also converts the plurality of DL digital signals into the plurality of Tx signals using the O2E/E2O converters 580, ADC/DAC 560, RF filters and mixers 570, and FEMs 590. The RH 550 transmits the Tx signals via the plurality of antennas 555a-555b to client(s), such as the clients 130 at block 230 of method 200. In some examples, as the RH performs method 200, the central control system 110 performs the method 250 as shown in FIG. 2B.

Method 250 begins at block 255 where the central control system 110 receives via the optical fiber fronthaul connection 150, an uplink (UL) optical signal from a connected radio head (RH) in a communication network. For example, the central control system 110 receives any of the UL optical signals generated by the arrangements 300, 400, and 500 in method 200.

At block 260 the central control system 110 processes the UL optical signal into a plurality of data streams for a network layer in the communication network. For example, in the arrangement 300, the UL optical signal is an UL analog signal. In some examples, processing the UL optical signal includes demultiplexing the UL analog signal at MUX 340a/b to isolate a plurality of antenna signals and processing the plurality of antenna signals using mixer/filter modules 335a/b and a switch matrix 330 to produce mixed and filtered digital antenna signals. The central control system 110 also processes the plurality of mixed and filtered digital antenna signals using digital signal processing at DSP 325a, and provides the decoded data/decoded output to a media access control module 320.

In the arrangement 400, the UL optical signal is a filtered UL digital signal. In some examples, processing the UL optical signal includes demultiplexing the UL digital signal at MUX 440a/b to isolate a plurality of antenna signals and processing the plurality of antenna signals using a decimation module 435a/b and a switch matrix 430 to produce decimated digital antenna signals. The central control system 110 also processes the plurality of decimated digital antenna signals using digital signal processing at DSP 425a, and provides the decoded data to a media access control module 420.

In the arrangement 500, the UL optical signal is a mixed and filtered UL digital signal. In some examples, processing the UL optical signal includes demultiplexing the UL digital signal at MUX 540_a/b_ to isolate a plurality of antenna signals and a switch matrix 530 to produce mixed and filtered digital antenna signals. The central control system 110 also processes the plurality of mixed and filtered digital antenna signals using digital signal processing at DSP 525_a_, and provides the decoded data to a media access control module 520.

Returning back to FIG. 2B, method 250 continues at block 265 where the central control system 110 receives, from the network layer, a DL data stream with digital data for transmission to the connected RH and processes the DL data stream into a DL optical signal at block 270. In the arrangement 300, the central control system 110 receives the DL data stream via a media access control module 320, the DL data stream includes a plurality of DL MSDUs. The central control system 110 processes the plurality of DL MSDUs using MAC 320 and DSP 325_a_, converting the plurality of DL signals using a switch matrix 330 and a filter/mixer module 335_c/d_ to the plurality of filtered and mixed DL analog signals. The central control system 110 also multiplexes, using MUX 345_a/b_, the plurality of DL analog signals for transmission via the optical fiber fronthaul connection 150. The central control system 110 also transmits the DL optical signal to the connected RH at block 275 of method 250.

In the arrangement 400, the central control system 110 receives the DL data stream via a media access control module 420, the DL data stream includes a plurality of DL MSDUs. The central control system 110 processes the plurality of DL MSDUs using MAC 420 and DSP 425_a_, converting the plurality of DL signals using a switch matrix 430 and an upsampling/mixer module 435_c/d_ to the plurality of upsampled and mixed DL digital signals. The central control system 110 also multiplexes, using MUX 445_a/b_, the plurality of DL digital signals for transmission via the optical fiber fronthaul connection 150. The central control system 110 also transmits the DL optical signal to the connected RH at block 275 of method 250.

In the arrangement 500, the central control system 110 receives the DL data stream via a media access control module 520, the DL data stream includes a plurality of DL MSDUs. The central control system 110 processes the plurality of DL MSDUs using MAC 520 and DSP 525_a_ and a switch matrix 530 to the plurality of DL digital signals. The central control system 110 also multiplexes, using MUX 540_a_, the plurality of DL digital signals for transmission via the optical fiber fronthaul connection 150. The central control system 110 also transmits the DL optical signal to the connected RH at block 275 of method 250.

The various mechanisms and signal processing described above and performed by the respective RHs and central control system 110 provide for reliable and fast communication between the RH and central control system 110, which enables the benefits of the OWNA architecture without latency or signal disruptions.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:

receiving, at a central control system via an optical fiber fronthaul connection, an uplink (UL) optical signal from a connected radio head (RH) in a communication network;

processing, at the central control system, the UL optical signal into a plurality of data streams for a network layer in the communication network, wherein the UL optical signal comprises a filtered UL digital signal, the processing comprising:

demultiplexing the filtered UL digital signal to isolate a plurality of antenna signals, processing the plurality of antenna signals using a mixer module, a decimation module and a switch matrix to produce a plurality of mixed and decimated signals, processing the plurality of mixed and decimated signals using digital signal processing to produce decoded data, and providing the decoded output to a media access control module;

receiving, from the network layer, a downlink (DL) data stream for transmission to the connected RH; and processing the DL data stream into a DL optical signal; and transmitting the DL optical signal to the connected RH.

2. The method of claim 1, wherein the DL optical signal comprises a filtered and mixed DL analog signal, wherein processing the DL data stream into the DL optical signal comprises:

receiving the DL data stream from a media access control module, wherein the DL data stream comprises digital data;

processing the digital data using digital signal processing to create a plurality of DL signals;

converting the plurality of DL signals using a switch matrix and a filter/mixer module to the plurality of filtered and mixed DL analog signals; and multiplexing the plurality of DL analog signals for transmission via the optical fiber fronthaul connection.

3. The method of claim 1, wherein the method further comprises:

transmitting control signals from the central control system to each connected RH using a spare wavelength in the DL optical signal.

4. The method of claim 1, wherein the method further comprises:

transmitting a reference frequency signal from the central control system to the connected RH using a spare wavelength in the DL optical signal.

5. The method of claim 1, wherein the central control system provides centralized transceiver functions for the connected RH.

6. A method comprising:

receiving, from a client device, a plurality of received (Rx) signals via a plurality of antennas in a radio head (RH);

processing the plurality of Rx signals at the RH to generate an uplink (UL) optical signal, wherein the UL optical signal comprises filtered digital signals, the processing comprising:

filtering the plurality of Rx signals, converting the plurality of Rx signals to a plurality of analog optical signals, and multiplexing the plurality of analog optical signals into the UL optical signal;

transmitting the UL optical signal from the RH to a central control system via an optical fiber fronthaul connection;

receiving downlink (DL) optical signal from the central control system via the optical fiber fronthaul connection, wherein the DL optical signal comprises upsampled and mixed digital signals;

processing the DL optical signal at the RH to generate a plurality of transmission (Tx) signals, wherein processing the DL optical signal to generate a plurality of transmission (Tx) signals comprises:

demultiplexing the DL optical signal into a plurality of DL optical signals;

converting the DL optical signals to DL upsampled and mixed digital signals; and converting the of DL upsampled and mixed digital signals into the plurality of Tx signals; and transmitting the plurality of Tx signals via the plurality of antennas.

7. The method of claim 6, wherein the plurality of Rx signals are converted to a plurality of digital optical signals.

8. The method of claim 6, wherein the method further comprises:

receiving one or more control signals from the central control system on a spare wavelength in the DL optical signal; and executing the one or more control signals on the RH.

9. The method of claim 6, wherein the method further comprises:

receiving a reference frequency signal from the central control system using a spare wavelength in the DL optical signal; and synchronizing processes on the RH according to the reference frequency signal.

10. The method of claim 6, wherein the central control system provides centralized transceiver functions for the RH.

11. A networking system comprising:

a central control system;

a plurality of radio heads; and a plurality of optical fiber fronthaul connections between the central control system and the plurality of radio heads; wherein the central control system comprises a plurality of hardware components, a control processor coupled to the plurality of hardware components and configured to perform a control operation comprising:

receiving, at the central control system via an optical fiber fronthaul connection, an uplink (UL) optical signal from a radio head (RH) of the plurality of RHs in a communication network, wherein the UL optical signal comprises a mixed and filtered digital signal;

processing, at the central control system, the UL optical signal into a plurality of data streams for a network layer in the communication network, the processing comprising:

demultiplexing the UL optical signal to isolate a plurality of mixed and filtered digital signals, processing the plurality of mixed and filtered digital signals using a switch matrix, and processing an output of the switch matrix using digital signal processing to produce decoded data;

receiving, from the network layer, a downlink (DL) data stream for transmission to the RH; and processing the DL data stream into a DL optical signal; and transmitting the DL optical signal to the RH using the optical fiber fronthaul connection; and wherein the RH comprises a plurality of hardware components and a RH processor coupled to the plurality of hardware components and configured to perform a RH operation comprising:

receiving, from a client device, a plurality of received (Rx) signals via an antenna in the RH;

processing the plurality of Rx signals to generate the uplink (UL) optical signal;

transmitting the UL optical signal to the central control system via the optical fiber fronthaul connection;

receiving the downlink (DL) optical signal from the central control system via the optical fiber fronthaul connection;

processing the DL optical signal to generate a plurality of transmission (Tx) signals; and transmitting the plurality of Tx signals via the antenna.

12. The system of claim 11, wherein the DL optical signal comprises a digital signal, wherein processing the UL optical signal comprises:

providing the decoded data to a media access control module; and wherein processing the DL data stream into the DL optical signal comprises:

receiving the DL data stream from a media access control module, wherein the DL data stream comprises digital data;

processing the digital data using digital signal processing to produce a plurality of DL signals;

processing the plurality of DL signals using a switch matrix; and multiplexing the plurality of DL signals for transmission via the optical fiber fronthaul connection.

13. The system of claim 11, wherein the control operation further comprises:

transmitting control signals from the central control system to the RH using a spare wavelength in the DL optical signal.

14. The system of claim 11, wherein the control operation further comprises:

transmitting a reference frequency signal from the central control system to the RH using a spare wavelength in the DL optical signal.

* * * * *